(12) United States Patent
Gay

(10) Patent No.: US 11,084,580 B2
(45) Date of Patent: Aug. 10, 2021

(54) ADJUSTABLE SHAPE KITE

(71) Applicant: Steven R Gay, Cochrane (CA)

(72) Inventor: Steven R Gay, Cochrane (CA)

( * ) Notice: Subject to any disclaimer, the term of this patent is extended or adjusted under 35 U.S.C. 154(b) by 271 days.

(21) Appl. No.: 16/215,759

(22) Filed: Dec. 11, 2018

(65) Prior Publication Data

US 2020/0180758 A1 Jun. 11, 2020

(51) Int. Cl.
*B64C 31/06* (2020.01)

(52) U.S. Cl.
CPC .................... *B64C 31/06* (2013.01)

(58) Field of Classification Search
CPC . B63H 8/16; B63H 8/10; B63H 9/069; A63H 27/08; B64C 31/06; B64C 31/036; G09F 21/06; B64D 17/025; B64D 17/02; B64D 17/22; B64D 17/24; B64D 17/343
USPC .................................. 40/215, 214
See application file for complete search history.

(56) References Cited

U.S. PATENT DOCUMENTS

| 2,737,360 | A | | 3/1956 | Allison |
| 5,033,698 | A | * | 7/1991 | Schimmelpfennig .. A63H 27/08 244/153 R |
| 5,433,401 | A | | 7/1995 | Ricketts |
| 5,938,150 | A | | 8/1999 | King |
| 6,520,454 | B2 | | 2/2003 | Winner |
| 6,631,872 | B1 | * | 10/2003 | Haggard ................. B64D 1/08 244/152 |
| 7,014,149 | B2 | | 3/2006 | Lynn |
| 7,036,771 | B1 | | 5/2006 | Puchkarev |
| 7,866,271 | B2 | * | 1/2011 | Wrage .................... B63H 9/069 114/102.16 |
| 2005/0127240 | A1 | | 6/2005 | Culp |
| 2005/0230556 | A1 | | 10/2005 | Legaignoux et al. |
| 2006/0097114 | A1 | | 5/2006 | Goodman |
| 2009/0179112 | A1 | | 7/2009 | Gu |
| 2012/0018584 | A1 | | 1/2012 | Lawson |
| 2017/0050729 | A1 | | 2/2017 | Enserink et al. |
| 2017/0253339 | A1 | * | 9/2017 | Berland ................. B64D 17/34 |
| 2017/0297701 | A1 | | 10/2017 | Hornzee-Jones et al. |

FOREIGN PATENT DOCUMENTS

| EP | 1207102 A2 * | 5/2002 | ........... B64D 17/025 |
| FR | 2610895 A1 * | 8/1988 | ........... B64D 17/025 |

* cited by examiner

*Primary Examiner* — Richard R. Green
*Assistant Examiner* — Madison Elizabeth Dittner
(74) *Attorney, Agent, or Firm* — Lewellyn Law, PLLC; Stephen Lewellyn

(57) ABSTRACT

An adjustable shape kite has a wing of a flexible material and an adjustable bridle system. The wing is a single layer wing that does not include structural support to provide its shape during flight. The bridle system is adjustable to adjust the wing curvature during flight. An aerodynamic shape is formed in the wing with a leading edge and side edges being rolled over by oncoming wind acting against the wing in conjunction with tensile forces acting thereon by the bridle lines of the bridle system.

7 Claims, 8 Drawing Sheets

ADJUSTABLE SHAPE KITE

FIELD OF THE INVENTION

The present invention relates to controllable kites, and more particularly to a single skin kite having an adjustable bridle system for changing the aerodynamic shape of the kite.

BACKGROUND OF THE INVENTION

Using kites for sporting, transportation, and other various uses are well known in the art. In kites, such as that of the present invention, the curve profile of the wing, and especially the front or leading edge of the wing, is very important in determining flight capability and maneuverability. Some prior art kites use one or a combination of rigid or semi-rigid frames and air inflatable spaces to give the wing its curved profile. While these prior art kites fulfil their respective requirements and objectives, there are drawbacks to these kite constructions. Drawbacks include, for example, difficulty in launching the kite in high winds, capturing water and snow, and fixed wing curvature. Accordingly, a need and desire exist for a new kite construction that overcomes the foregoing described drawbacks and other inherent drawback in current kite constructions.

SUMMARY OF THE INVENTION

Embodiments of the present invention provide a new kite construction of a single skin or layer wing of flexible material that does not include any rigid, semi-rigid, or air inflatable spaces, which overcomes the drawbacks found in kites having such structures for providing support and curvature to the kite wing.

An object of embodiments of the invention is to provide a light weight, inexpensive kite construction that can be easily stored, transported, and setup for flying.

Another object of embodiments of the invention is to provide a kite having a single layer wing constructed of flexible material and an adjustable bridle system for changing the aerodynamic shape of the wing as desired to achieve certain flight characteristic as needed for a specific application.

Another object of embodiments of the invention is to provide a kite that can be launch in high winds, whereby the kite can be laid across a ground surface on its back or top surface without the wing being captured by wind blowing across the ground surface.

Yet another object of embodiments of the invention is to provide a kite that can be deployed by a drone during flight if the drone becomes disabled to prevent the drone from crashing into the ground.

Yet another object of embodiments of the invention is to provide a kite that can be used to lift waterlines to fight forest fires.

Yet another object of embodiments of the invention is to provide a kit that can be used with wind turbines to capture wind force.

There has thus been outlined, rather broadly, the more notable features of the invention in order that the detailed description thereof that follows may be better understood and in order that the present contribution to the art may be better appreciated.

Numerous objects, features and advantages of the present invention will be apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in several ways. Also, should be understood that the phraseology and terminology employed herein are for descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The drawings illustrate one or more embodiments the invention for illustrative discussion of the invention. No attempt is made to show structural details of the embodiments in more detail than is necessary for an understanding of the invention. The description taken with the drawings, making apparent to those skilled in the art how the several forms of the invention may be embodied in practice. Identical reference numerals do not necessarily indicate an identical structure. Rather, the same reference numeral may be used to indicate a similar feature or a feature with similar functionality. In the drawings.

DETAILED DESCRIPTION OF THE INVENTION

Figure 1:
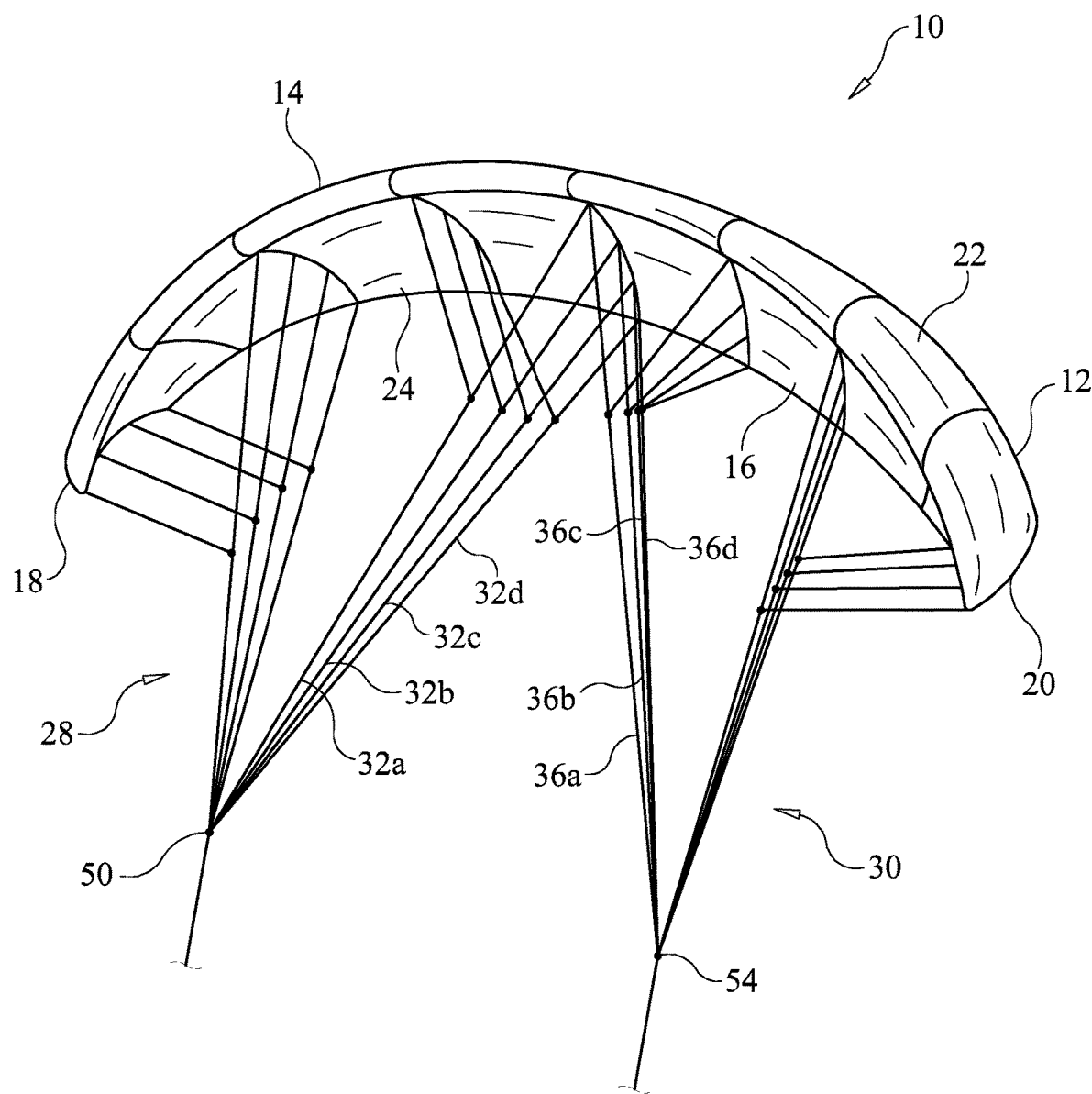
FIG. 1 is a perspective view of a kite constructed in accordance with an embodiment of the invention, shown in flight.
Figure 2:
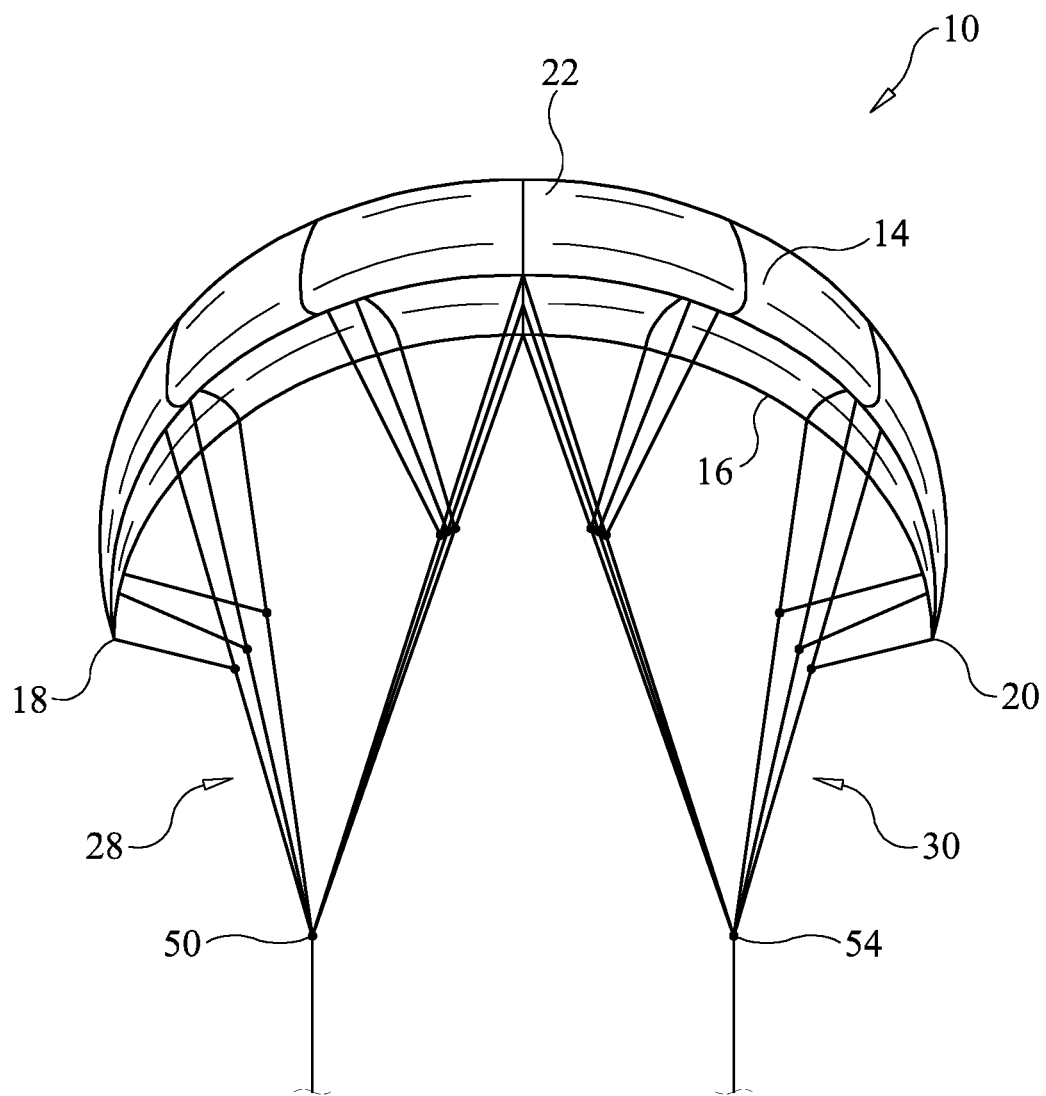
FIG. 2 is a front view of the kite shown in flight.
Figure 3:
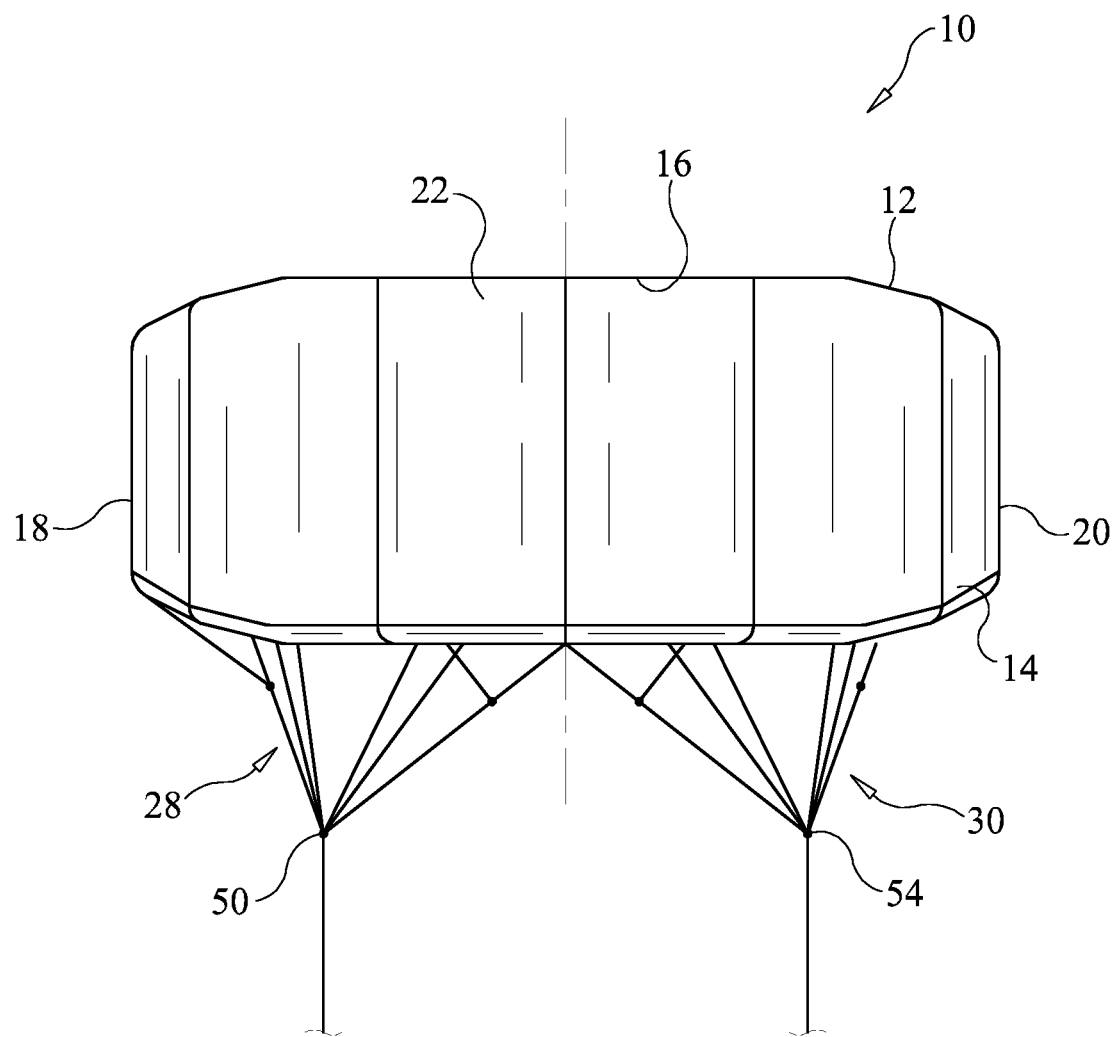
FIG. 3 is a top view of the kite shown in flight.
Figure 4:
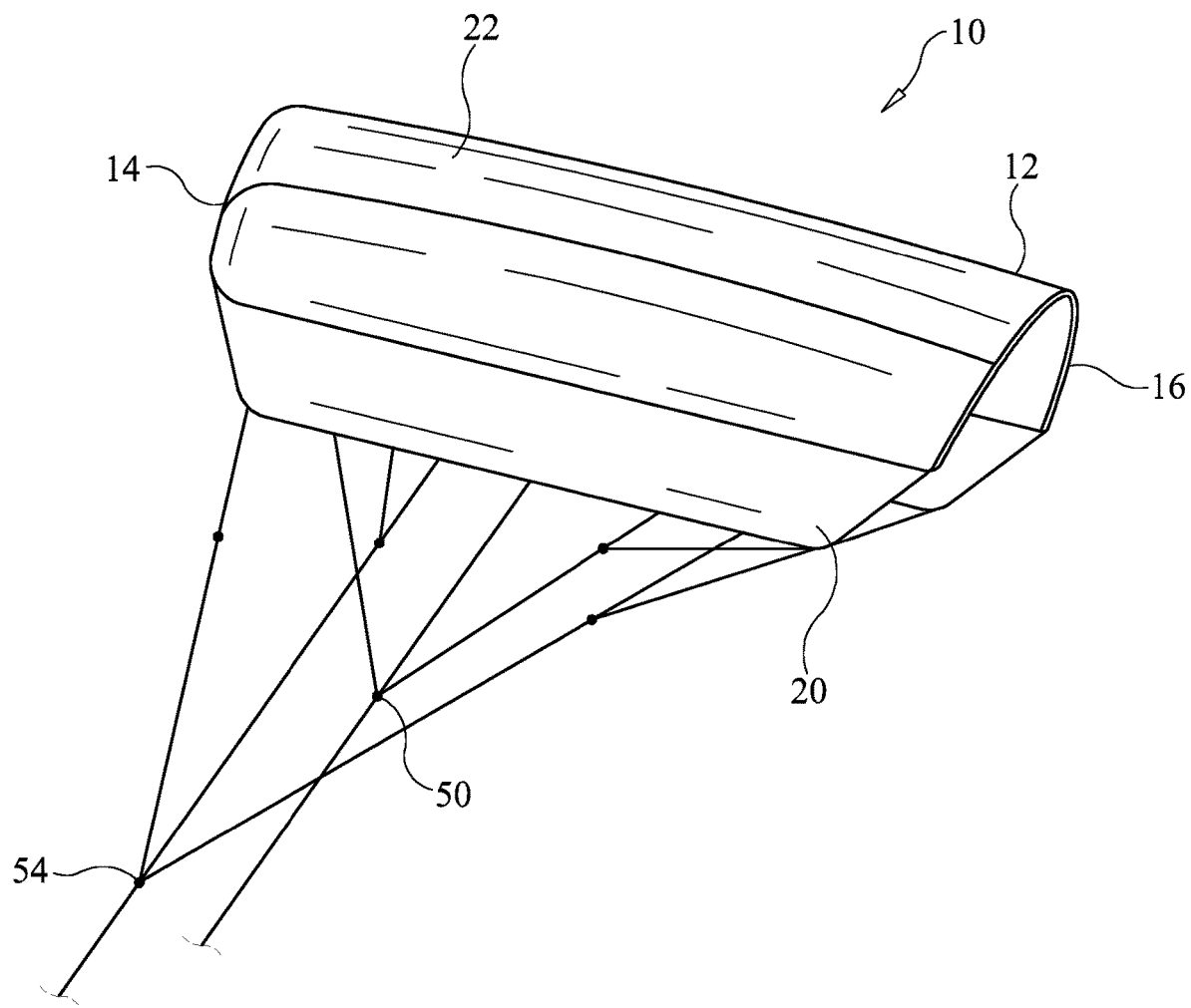
FIG. 4 is a side view of the kite shown in flight.
Figure 5:
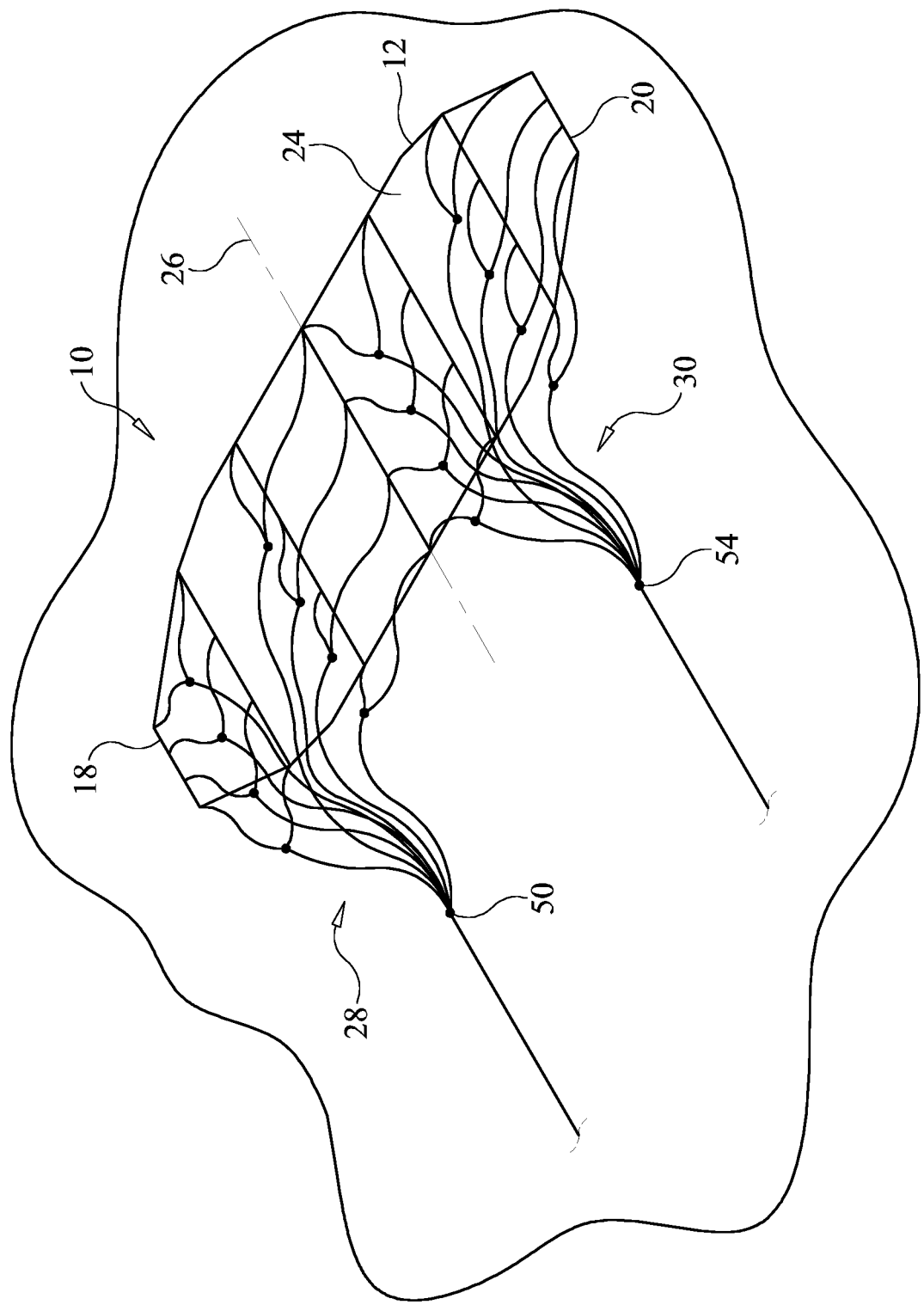
FIG. 5 is a perspective view of the kite shown laid flat upon a ground surface and ready to be deployed.
Figure 6:
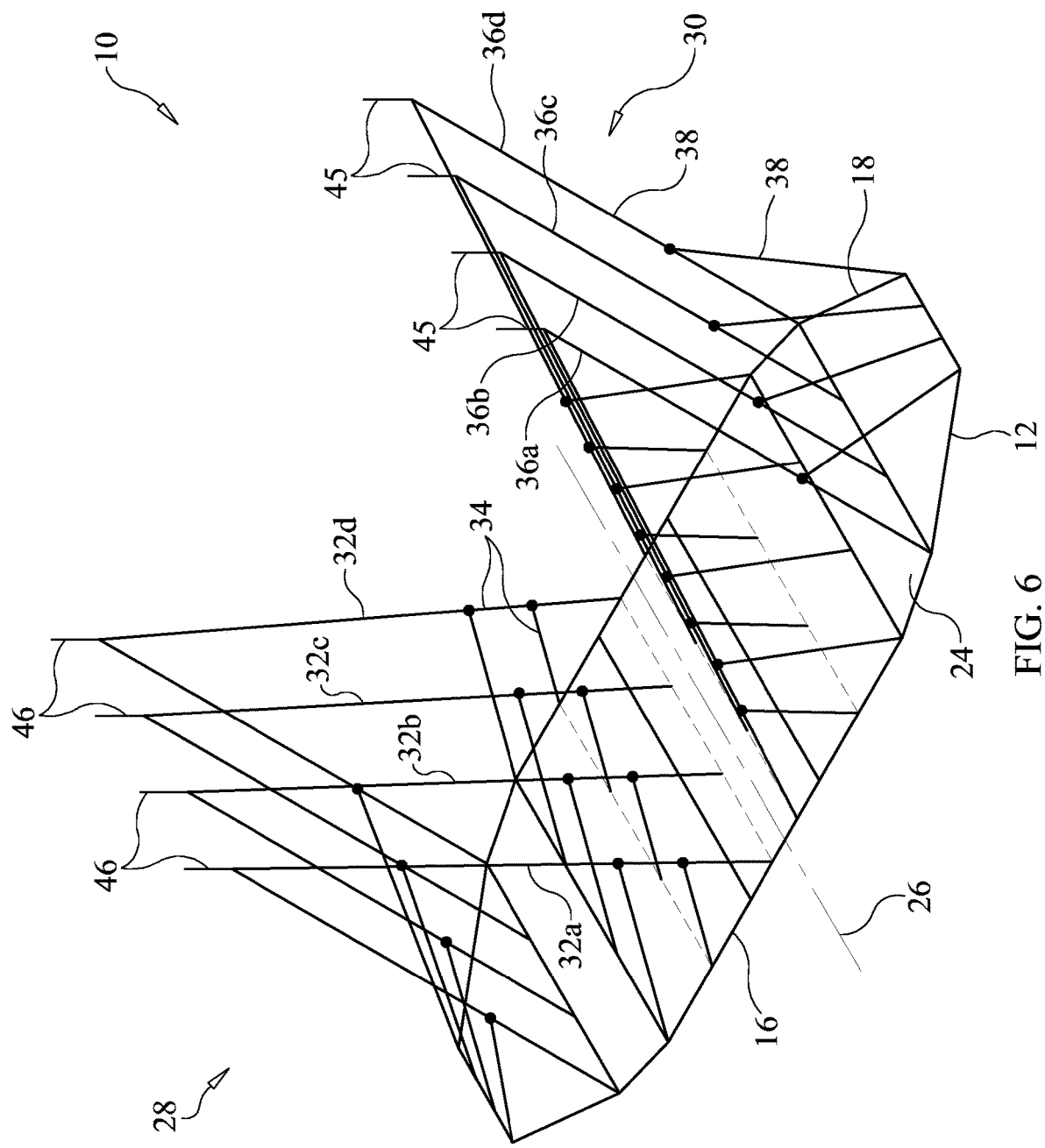
FIG. 6 is a perspective view of the kite and a bridle system.

Referring to FIGS. 1 through 9 of the drawings, kite 10 comprises a wing 12 having a leading edge 14, a trailing edge 16, opposite side edges 18 and 20, a top surface 22, a bottom surface 24 opposite of said top surface, and a centerline 26 extending transversely thereof. Wing 12 is constructed of a flexible material and has traction-type construction with no rigid, semi-rigid, or ram air structural elements. Rather, as will become apparent from the following disclosure, the span wise and chord wise form of wing 12 is held by a combination of aerodynamic forces and a plurality of bridle lines.

Particularly, wing 12 comprises a single layer or single skin of flexible material, shaped and supported by bridles in such a way as to generate aerodynamic forces that are enough to form the span wise and chord wise shape of the kite 10. Suitable flexible materials are known in the art, and as a none limiting example, canvas and ripstop nylon are two types of flexible material that can be used to construct the wing 12.

The wing 12 is constructed from panels cut to shape from the flexible material. The cut panels are then then assembled by gluing the panels together with an overlap seam between adjacent panel sides. After the glue dries, the seams are treated by spraying with a silicone water-guard. To further prevent water intrusion into the seams, the seams may be finally sealed with a silicone caulking.

Kite 10 further includes an adjustable bridle line assembly having a first bridle line sub-assembly 28 and a second bridle line sub-assembly 30. The first bridle line sub-assembly has at least four bridle line assemblies 32a-32d each comprising a plurality of bridle lines 34 that are attached to the bottom surface 24 in transversely spaced rows that extend longitudinally across the bottom surface on one side of the centerline 26. The second bridle line sub-assembly 30 has at least four bridle line assemblies 36a-36d each comprising a plurality of bridle lines 38 that are attached to the bottom 24 surface in transversely spaced rows that extend longitudinally across the bottom surface on an opposite side of the centerline 26. Preferably bridle line assemblies 32a-32d are symmetrical with bridle line assembles 36a-36d with respect to the centerline 26. The number of bridle lines 34 in each bridle line assembly 32a-32d and bridle lines 38 in each bridle line assembly 36a-36d may be as many as desired in order to form the shape of the wing 12.

Figure 7:
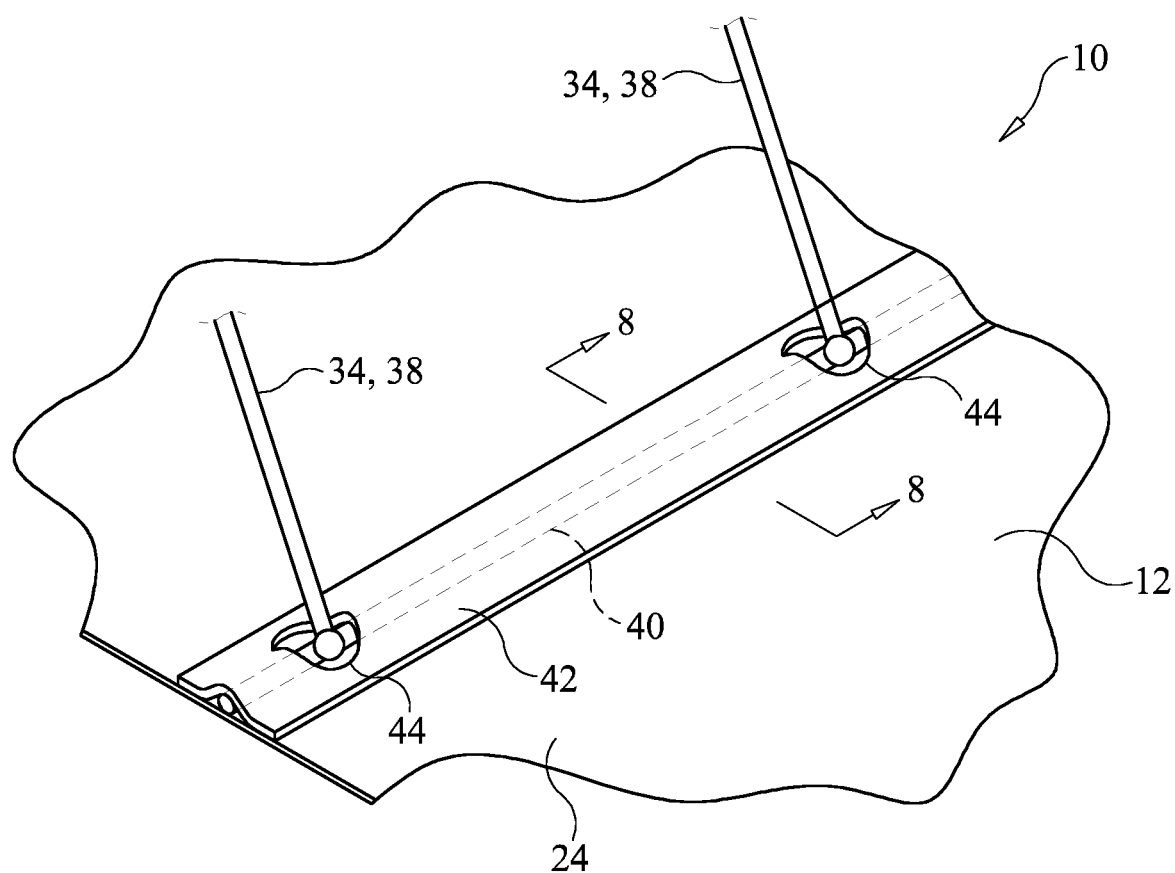
FIG. 7 is an enlarged, partial perspective view of the kite showing a bridle anchor line attachment.
Figure 8:
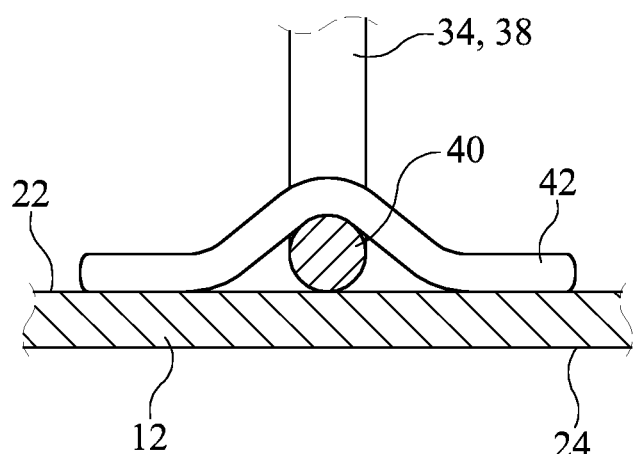
FIG. 8 is a cross-section view taken along line 8-8 in FIG. 7.
Figure 9:
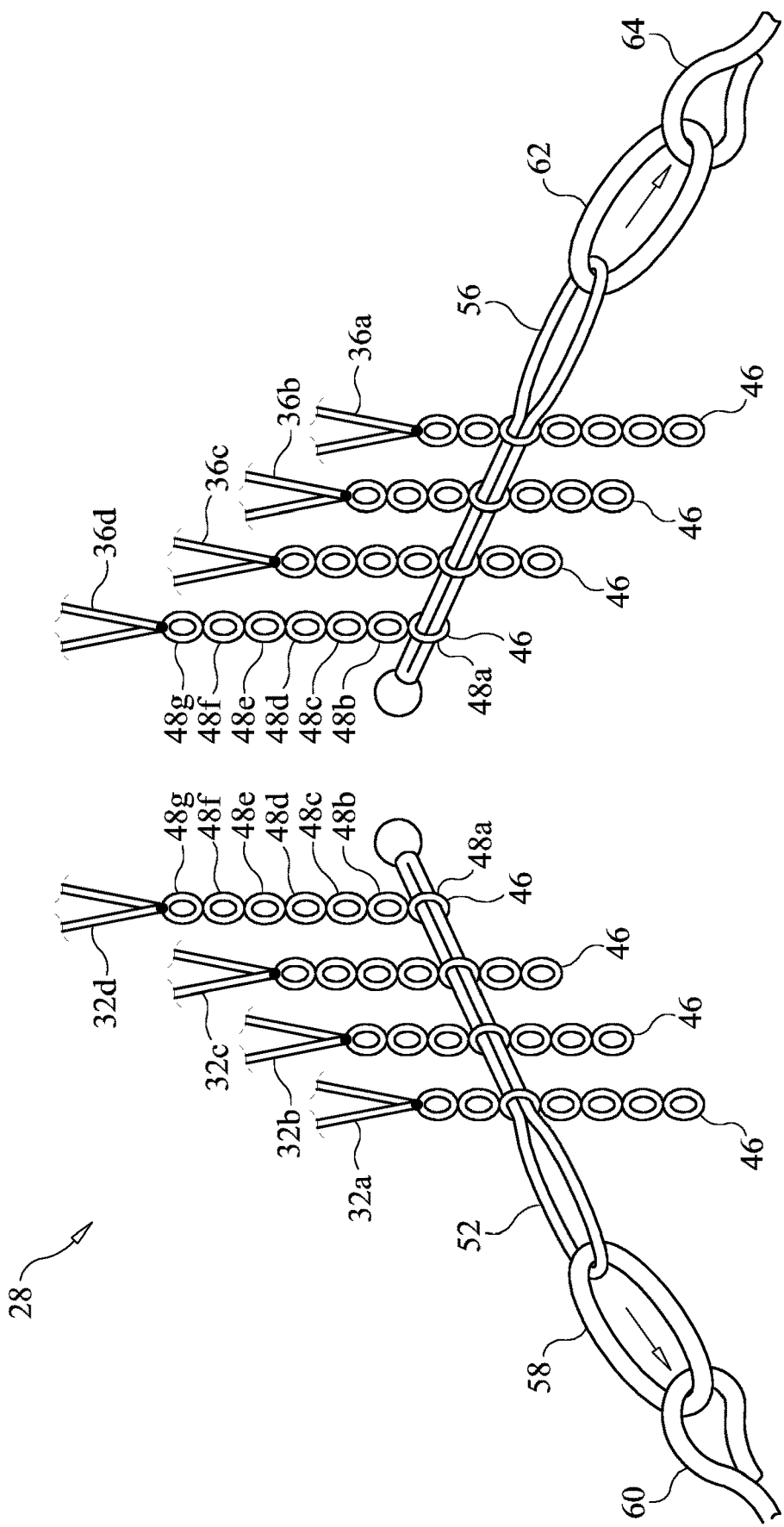
FIG. 9 a perspective view of an adjustment assembly of a bridle line system.

Bridle lines 34 and 38 are attached to wing 12 by bridle attachment anchor lines 40 that are longitudinally spaced from each other and extend transversely across the bottom surface 24. As seen in FIGS. 7 and 8, in embodiments, each anchor line 40 is attached to the wing 12 by laying the line across the transverse length of the wing and then gluing a strip 42 of the flexible material along the top of the line. Opposite ends of the line are knotted to prevent the line from pulling through the attachment. As further shown the strip 42 has holes 44 formed into it at spaced intervals along the length of strip to permit access to the line for attaching bridle lines 34,38 to the anchor line 40.

Each bridle line assembly 32a-32d and 36a-36d has a similar bridle line end 46 that has a plurality of loops 48a-48g arranged end-to-end along its length. Bridle line assemblies 32a-32s are attached to each other at a common juncture 50 by a bridle key 52 that is passed through one loop 48a-48g of the respective bridle line ends 46. Similarly, bridle line assemblies 36a-36d are attached to each other at common juncture 54 by a bridle key 56 that is passed through one loop 48a-48g of the respective bridle line ends 46. In this manner, the overall length of each bridle line assembly 32a-32d as taken from the bottom surface 24 to the juncture 50 can be adjusted relative to one another. And the overall length of each bridle line assembly 36a-36d as taken from the bottom surface 24 to the juncture 54 can be adjusted relative to one another.

Adjustment of relative lengths provides the adjustable shaping of the wing 12 of kite 10 and pitch or angle of attack of the wing 12. Particularly, by positioning bridle key 52 through loop 48e of bridle line assembly 32a and bridle key 56 through loop 48e of bridle line assembly 36a will cause the leading edge 14 to have a greater curvature than if the keys where positioned through loop 48a, respectively. Accordingly, by changing the positioning of the keys 52 and 56 through respective loops, the overall curvature of the wing can be changed. This is so because the aerodynamic shape is formed in the wing by oncoming wind acting against the wing in conjunction with tensile forces acting thereon by the bridle lines of each of said first and second bridle line sub-assemblies.

Additionally, an elastomeric coupling 58 can be used to connect key 52 to control line 60 and an elastomeric coupling 62 can be used to connect key 56 to control line 64.

Several embodiments of the invention have been described. Nevertheless, those skilled in the art, having benefit of this disclosure, will appreciate that various modifications may be made without departing from the spirit and scope of the invention. Accordingly, other embodiments are within the scope of the appended claims.

What is claimed is:

1. An adjustable shape kite comprising:
   a wing of a flexible material having a leading edge, a trailing edge, opposite side edges, a top surface, a bottom surface opposite of said top surface, and a centerline extending transversely thereof, said wing being free of any inflatable spaces and rigid support structures;
   an adjustable bridle line assembly having a first bridle line sub-assembly and a second bridle line sub-assembly;
   said first bridle line sub-assembly having at least four bridle line assemblies each comprising a plurality of bridle lines that are attached to said bottom surface in transversely spaced rows that extend longitudinally across the said bottom surface on a first side of said centerline;
   said second bridle line sub-assembly having at least four bridle line assemblies each comprising a plurality of bridle lines that are attached to said bottom surface in transversely spaced rows that extend longitudinally across said bottom surface on a second side of said centerline;
   each of said bridle line assemblies having a bridle line end that has a plurality of closed loops arranged therealong;
   wherein the bridle line ends of each bridle line assembly of said first bridle line sub-assembly are connected to each other at a common first juncture by a first key disposed through a selected closed loop of each bridle line end;
   wherein the bridle line ends of each bridle line assembly of said second bridle line sub-assembly are connected to each other at a common second juncture by a second key disposed through a selected closed loop of each bridle line end;
   wherein an aerodynamic shape is formed in said wing with said leading edge and said side edges being rolled over by oncoming wind acting against said wing in conjunction with tensile forces acting thereon by the bridle lines of each of said first and second bridle line sub-assemblies; and
   wherein said aerodynamic shape is adjusted by changing which closed loop of each bridle line end said first key and said second key are disposed.

2. The adjustable shape kite of claim 1, wherein said wing is constructed of a plurality of panels of said flexible material that are glued together.

3. The adjustable shape kite of claim 1, further comprising a plurality of bridle attachment anchor lines attached to said single layer wing that are longitudinally spaced from each other and extend transversely across said bottom surface.

4. The adjustable shape kit kite of claim 3, wherein bridle lines of each of said bridle line assemblies of said first bridle line sub-assembly are attached to different bridle attachment anchor lines located on said first side of said centerline, and wherein bridle lines of each of said bridle line assemblies of said second bridle line-sub-assembly are attached to different bridle attachment anchor lines located on said second side of said centerline.

5. The adjustable shape kite of claim 1, wherein bridle lines of one bridle line assembly of said first bridle line sub-assembly are attached to said bottom surface along said leading edge, and wherein bridle lines of one bridle line assembly of said second bridle line sub-assembly are attached to said bottom surface along said leading edge.

6. The adjustable shape kite of claim 1, further comprising a first control line attached to said first common juncture and a second control line attached to said second common juncture.

7. The adjustable shape kite of claim 6, further comprising a first elastomeric coupling between said first control line and said first common juncture and a second elastomeric coupling between said second control line and said second common juncture.

\* \* \* \* \*